US009967336B2

(12) United States Patent
El-Ansary et al.

(10) Patent No.: US 9,967,336 B2
(45) Date of Patent: May 8, 2018

(54) DISTRIBUTING CONTENT DATA TO RESOURCE CONSTRAINED DEVICES IN A SEGMENT OF A P2P NETWORK

(71) Applicant: Hive Streaming AB, Stockholm (SE)

(72) Inventors: Sameh El-Ansary, Stockholm (SE); Mahmoud Ahmed Ismail, Stockholm (SE); Roberto Roverso, Stockholm (SE); Mohammed El-Beltagy, Stockholm (SE)

(73) Assignee: HIVE STREAMING AB, Stockholm (SE)

( * ) Notice: Subject to any disclaimer, the term of this patent is extended or adjusted under 35 U.S.C. 154(b) by 14 days.

(21) Appl. No.: 14/134,938

(22) Filed: Dec. 19, 2013

(65) Prior Publication Data

US 2015/0180795 A1    Jun. 25, 2015

(51) Int. Cl.
*G06F 15/173* (2006.01)
*H04L 29/08* (2006.01)

(52) U.S. Cl.
CPC ...... *H04L 67/1091* (2013.01); *H04L 67/1061* (2013.01); *H04L 67/04* (2013.01); *H04L 67/1008* (2013.01)

(58) Field of Classification Search
CPC . H04W 84/18; H04W 28/0215; H04W 72/04; H04W 72/048; H04W 36/22; H04W 40/00; H04W 48/02; H04L 67/104; H04L 67/1085; H04L 47/125; H04L 41/0893; H04L 45/127

(Continued)

(56) References Cited

U.S. PATENT DOCUMENTS 8,230,098 B2 *  7/2012  Chen et al. ............... 709/231
8,477,658 B2 *  7/2013  Tsang et al. .............. 370/255

(Continued)

FOREIGN PATENT DOCUMENTS

EP        1615403 A1      1/2006
WO    2013072284 A2      5/2013

OTHER PUBLICATIONS

Tara Small et al., "Scaling Laws and Tradeoffs in Peer-to-Peer Live Multimedia Streaming", Jan. 2, 2006, pp. 539-548.

(Continued)

*Primary Examiner* — Tauqir Hussain
(74) *Attorney, Agent, or Firm* — Volpe and Koenig, P.C.

(57) ABSTRACT

A network supervising device for managing distribution of data content streams in a segment of a peer-to-peer (P2P) network, comprises a processing unit which receives a request for a data content stream from at least one of the peers being constrained from uploading the data content streams to further peers, and identifies whether at least one peer exists within the network segment being capable of uploading the requested data content stream. If no peer within the segment is currently rendering the requested data content stream, the processing unit identifies whether at least one currently idle peer exists within the network segment, which is capable of uploading the requested data content stream. The processing unit then assigns to the at least one peer downloading the requested data content stream, or to the at least one currently idle peer, to upload the requested data content stream to the peer being restrained.

26 Claims, 12 Drawing Sheets

(58) Field of Classification Search
USPC .................................................. 709/226, 231
See application file for complete search history.

(56) References Cited

U.S. PATENT DOCUMENTS

| | | | |
|---|---|---|---|
| 2005/0091399 A1* | 4/2005 | Candan et al. ............... | 709/238 |
| 2006/0140207 A1* | 6/2006 | Eschbach ............ | H04L 12/1836 |
| | | | 370/432 |
| 2008/0144621 A1* | 6/2008 | Huang ................ | H04L 65/4076 |
| | | | 370/390 |
| 2009/0274158 A1* | 11/2009 | Sharp et al. .................. | 370/400 |
| 2010/0030909 A1* | 2/2010 | Magharei et al. ............ | 709/231 |
| 2010/0153771 A1* | 6/2010 | Gordon et al. ................... | 714/4 |
| 2010/0260093 A1* | 10/2010 | Liu et al. ....................... | 370/315 |
| 2011/0131278 A1* | 6/2011 | Nieh et al. .................... | 709/204 |
| 2011/0252115 A1* | 10/2011 | Karlsson et al. ............. | 709/217 |
| 2011/0282989 A1* | 11/2011 | Geirhofer et al. ............ | 709/224 |
| 2011/0289218 A1* | 11/2011 | Luzzatti et al. .............. | 709/226 |
| 2012/0151051 A1* | 6/2012 | Zhang ..................... | H04L 67/06 |
| | | | 709/224 |
| 2012/0191778 A1* | 7/2012 | Kim et al. .................... | 709/204 |

OTHER PUBLICATIONS

International Search Report and Written Opinion for PCT/EP2014/074035, dated Jan. 15, 2015, 12 pages.

* cited by examiner

DISTRIBUTING CONTENT DATA TO RESOURCE CONSTRAINED DEVICES IN A SEGMENT OF A P2P NETWORK

FIELD OF INVENTION

The invention relates to a network supervising device and a method at a network supervising device of managing distribution of data content in a segment of a peer-to-peer (P2P) network. The invention further relates to a peer device and a method of downloading data content at a peer being constrained from uploading the data content to further peers in a segment of a P2P network.

BACKGROUND

Peer-to-peer (P2P) streaming has been gaining a great deal of attention due to its ability to distribute content in a relatively inexpensive manner as compared to traditional client-server solutions. In the art, live streaming has been effectuated by a streaming server uploading to peers or clients requesting a live content stream. Such a unicast content distribution structure can however not scale to a large number of clients, as bandwidth and processing requirements on the streaming server will be severe. An alternative is to use Content Distribution Networks (CDNs) instead of a single streaming source but this solution is also relatively costly as the number of clients becomes large. In order to address the operating cost of the CDNs for a large number of clients, P2P live streaming systems were proposed to significantly reduce the bandwidth requirement of the P2P streaming source(s) or distribution server(s) in a CDN. P2P live streaming systems are based on the concept of utilizing upload bandwidth of peers in order to save some of the bandwidth required from the streaming source, by allowing peers to stream to each other. However, use of P2P upload might not be applicable to all devices as the uploading of content from one uploading peer to several other peers could affect the uploading peer negatively in terms of processing power and battery life. This is exemplified by resource constrained devices such as smart phones and tablets. An obvious workaround to this problem is to simply prevent such resource constrained devices from uploading data and instead rely on non-constrained peers for uploading content. This solution could be considered provided that there are a sufficient number of peers that can act as uploaders for the resource constrained peers. If there are an insufficient number of such non-constrained peers, the resource constrained peers would have to download from a P2P streaming server or a CDN.

The situation is made significantly more complex when a mix of different types of peers exists inside a private network. Such private networks are common in corporate and enterprise settings. A private network can be divided into any number of network segments representing for example different geographic premises, offices and/or departments. In such setting, there is a desire to minimize the amount of data traffic flowing in or out of any particular network segment. Having a significant number of resource constrained peers in such network segment is bound to increase the traffic in and out of the segment with existing P2P approaches.

SUMMARY

An object of the present invention is to solve, or at least mitigate, one or more of these problems in the art.

This object is attained in a first aspect of the present invention by a method at a network supervising device of managing distribution of data content streams in a segment of a P2P network, which network segment comprises one or more peers being constrained from uploading the data content streams to further peers. The method comprises receiving a request for a data content stream from at least one of the peers being constrained from uploading the data content to further peers, identifying whether at least one peer exists within the network segment being capable of uploading the requested data content stream, which peer is downloading the requested data content stream. If no peer within the segment is downloading the requested data content stream, it is identified whether at least one currently idle peer exists within the network segment, which currently idle peer is capable of uploading the requested data content stream. Thereafter, the method comprises assigning to the at least one peer downloading the requested data content stream, or in case no such peer is available, to the at least one currently idle peer, to upload the requested data content stream to the peer being restrained from uploading data content to further peers.

This object is attained in a second aspect of the present invention by a peer device being constrained from uploading data content to further peer devices in a segment of a P2P network. The peer device comprises a processing unit being arranged to receive from the other peer devices in the network segment broadcast information regarding which streams of data content the other peer devices in the network segment are capable of uploading, or whether there are any currently idle peer devices in the network segment capable of uploading streams of data content. The processing unit is further arranged to make a request for a data content stream to a peer device within the network segment being capable of uploading the requested data content stream, which peer device is downloading the requested data content stream, or if no peer device within the segment is downloading the requested data content stream, to a currently idle peer device within the network segment, which currently idle peer device is capable of uploading the requested data content stream. Further, the processing unit of the peer device is arranged to download the requested data content stream from the peer device downloading the requested data content stream, or from the currently idle peer device in case no peer in the segment is downloading the requested content data stream.

This object is further attained according to the first aspect of the present invention by a network supervising device for managing distribution of data content in a segment of a P2P network, which network segment comprises one or more peers being constrained from uploading the data content to further peers. The network supervising device comprises a processing unit being arranged to receive a request for a data content stream from at least one of the peers being constrained from uploading the data content to further peers, and to identify whether at least one peer exists within the network segment being capable of uploading the requested data content stream, which peer is downloading the requested data content stream. If no peer within the segment is downloading the requested data content stream, the processing unit identifies whether at least one currently idle peer exists within the network segment, which currently idle peer is capable of uploading the requested data content stream. Further, the processing unit is arranged to assign to the at least one peer downloading the requested data content stream, or in case no such peer is available, to assign to the at least one currently idle peer, to upload the requested data content stream to the peer being restrained from uploading data content to further peers.

This object is further attained according to the second aspect of the present invention by a peer device being constrained from uploading data content to further peer devices in a segment of a P2P network. The peer device comprises a processing unit being arranged to receive from the other peer devices in the network segment broadcast information regarding which streams of data content the other peer devices in the network segment are capable of uploading, or whether there are any currently idle peer devices in the network segment capable of uploading streams of data content. The processing unit is further arranged to make a request for a data content stream to a peer device within the network segment being capable of uploading the requested data content stream, which peer device is downloading the requested data content stream, or if no peer device within the segment is downloading the requested data content stream, to a currently idle peer device within the network segment, which currently idle peer device is capable of uploading the requested data content stream. Moreover, the processing unit of the peer device is arranged to download the requested data content stream from the peer device downloading the requested data content, or from the currently idle peer device, if no peer in the segment is downloading the requested segment.

Advantageously, with the present invention, a peer being constrained from uploading data content to other peers, i.e. a peer referred to as "resource constrained" will turn to a peer being capable of uploading data content to other peers, i.e. a peer referred to as "non-constrained" within the same network segment. In this context, it should be noted that the peers referred to as "resource constrained" generally not is restrained from uploading one or more streams of data content due to limitations in upload capacity. Rather, they are resource restrained in that they have limited processing power and battery life for effecting uploads of data streams as compared to e.g. a PC or even a laptop (in particular when connected to a grid), which generally do not have these restrictions. A resource constrained peer device is typically a mobile phone or a tablet.

Thus, the resource constrained peer advantageously requests a desired stream of content data from a non-constrained peer which is downloading the requested stream of content data. If no non-constrained peer in the segment is downloading the requested content data stream, the resource constrained peer will request the stream of content data from a currently idle non-constrained peer in the segment. Advantageously, with the present invention, the number of incoming connections to a given network segment can be greatly reduced, while needs of the resource constrained peers are catered to, which is achieved by making effective use of available upload capacity of the non-constrained peers.

As is reflected in the first and second aspect of the present invention, respectively, this can either be managed by a network supervising device known as a tracker or by the peer devices themselves. When the distribution of data content is triggered in a centralized manner, where the tracker coordinates the process, an advantage is that the tracker is generally a computationally more powerful device than the peer devices, e.g. embodied in the form of a high-speed server. Further advantageous is that tracker knows the status and capabilities of the peers in the network segment(s) and possibly of the remaining peers in the P2P network on which the segment is a part.

If the process is triggered in a decentralized manner, where the respective resource constrained peer coordinates the process, an advantage is that there is no need to have a centralized device (i.e. the tracker) keeping track of the status and capabilities of the peers. Instead, the peers themselves keep track of status and capabilities, which can be implemented by having the network peers broadcast to the other network peers their status and capabilities.

In an embodiment of the present invention, the tracker or requesting peer determines, in order of priority, whether (1) any non-constrained peer is rendering the requested data stream, (2) any non-constrained relaying peer is uploading the requested content data stream to further peer(s), a relaying peer being a peer used for the purpose of uploading data content to further peers, but which does not render the data content itself, or (3) any non-constrained idle peer exist which can upload the requested data content stream. The peer subsequently uploads the requested data content stream in accordance with this order of priority. Advantageously, by checking whether relaying peers exists (unless a currently rendering peer exist), the number of idle peers to be recruited may be reduced. Further advantageous is that by selecting a rendering peer before a relaying peer, resources could potentially be freed up, since the relaying peer does not download the data stream for its own benefit, but only for the benefit of the resource constrained downloaders residing downstream of the relaying peer, and thus will become idle once it is freed from the task of relaying data.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE PREFERRED EMBODIMENTS

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Throughout the drawings, peers indicated with a square shape are considered non-constrained, peers indicated with a triangular shape are considered resource constrained, and peers indicated with dashed lines are relaying peers. Further, non-connected peers within a segment are idle peers.

Figure 1:
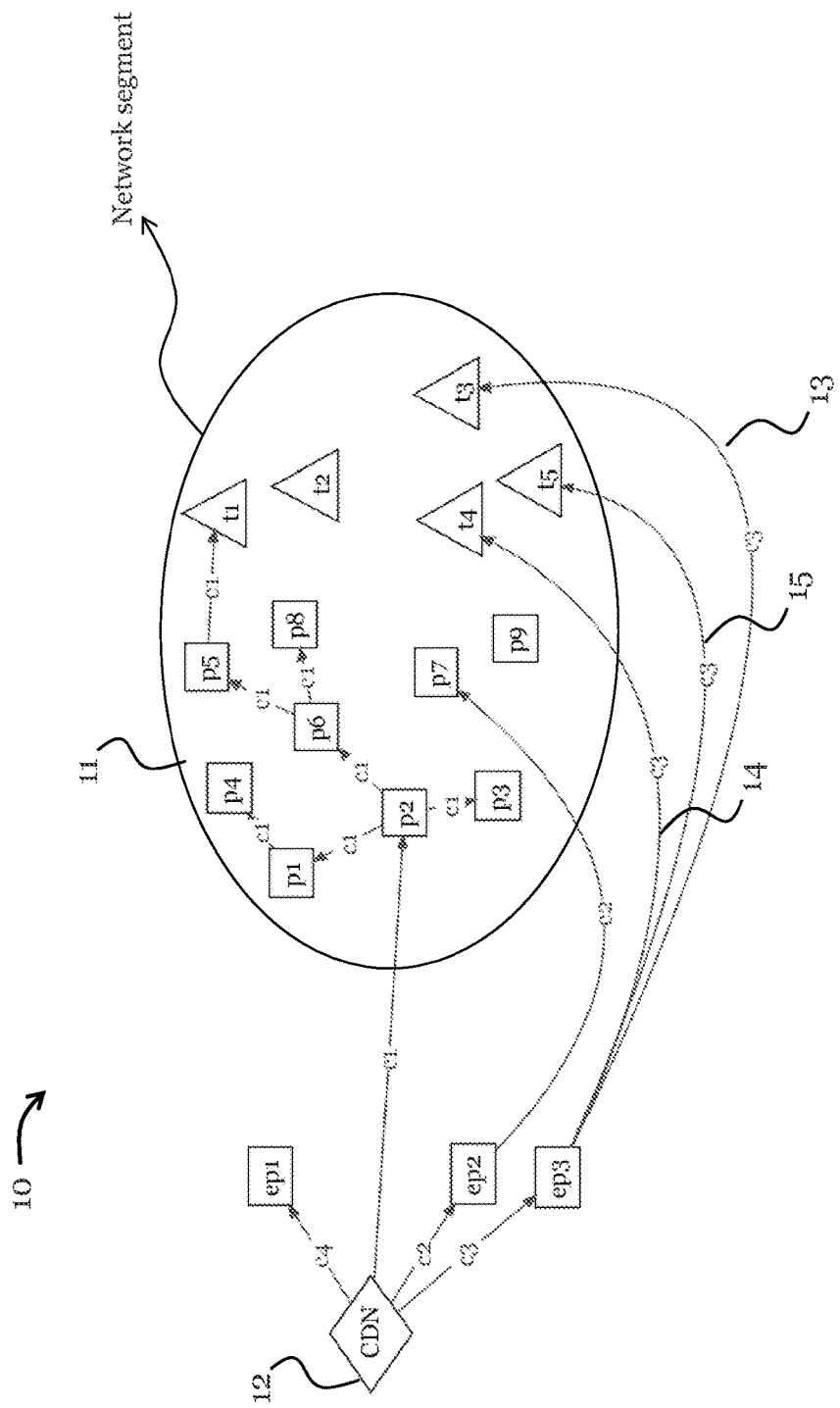
FIG. 1 shows a part of a P2P network comprising a network segment.

FIG. 1 shows a part of a P2P network 10, which part comprises a network segment 11, e.g. embodied in the form of a private network, accommodating nine non-constrained peers p1-p9 as well as five resource-constrained peers t1-t5 (which "peers" in practice imply peer devices such as television sets, mobile phones, computers, laptops, smart phones, tablets, etc.). Of these 14 peers, two are in idle mode; peers t2 and p9, i.e. they are not currently participating in the downloading and/or uploading of three streams c1, c2, c3 of data content entering the network segment 11. Further shown in FIG. 1 are three peers ep1, ep2, ep3 residing outside the network segment 11 (i.e. they reside in one or more other network segments) and delivering two of the streams c2, c3 of data content distributed via four separate channels into the network segment 11 (content stream c1 being delivered via a fifth channel to peer p2). Finally, a streaming source 12 or CDN streams three of the streams c2, c3, c4 of data content to the peers ep1, ep2, ep3 residing outside the network segment 11 and a fourth stream c1 of data content directly into the network segment 11. As can be seen in FIG. 1, the resource-constrained peers t3, t4, t5 download the stream c3 of data content from outside the network segment 11 via communication channel 13, 14, 15, respectively.

In this context, it should be noted that the peers referred to as "resource constrained" are generally not restrained from uploading one or more streams of data content due to limitations in upload capacity. Rather, they are resource restrained in that they have limited processing power and battery life for effecting uploads of data streams as compared to e.g. a PC or even a laptop (in particular when connected to a grid), which generally do not have these restrictions. Thus, a mobile terminal such as a smart phone or a tablet could certainly upload one or more data streams if their potential upload capacity was the only concern; in e.g. a Local Area Network (LAN), peers within the LAN have a upload capacity that is only limited by the router of the LAN (which is usually very high). However, their processing and battery power would be severely taxed if they were to upload many data streams. Therefore, these resource constrained peers within a given network segment are restricted from uploading data content to other peers. This could e.g. be included in a network segment policy for the distribution of data within the segment; for instance, in an embodiment of the invention, when a new peer device is added to the network segment, it is classified as a resource constrained peer device if it belongs to a particular group of equipment (e.g. smart phone, tablet, etc.). Correspondingly, the peers referred to as "non-constrained" is capable of uploading data content to other peers, and do not have these limitations in CPU power and/or battery life, even though no peer of course has an infinite upload capacity.

Figure 2:
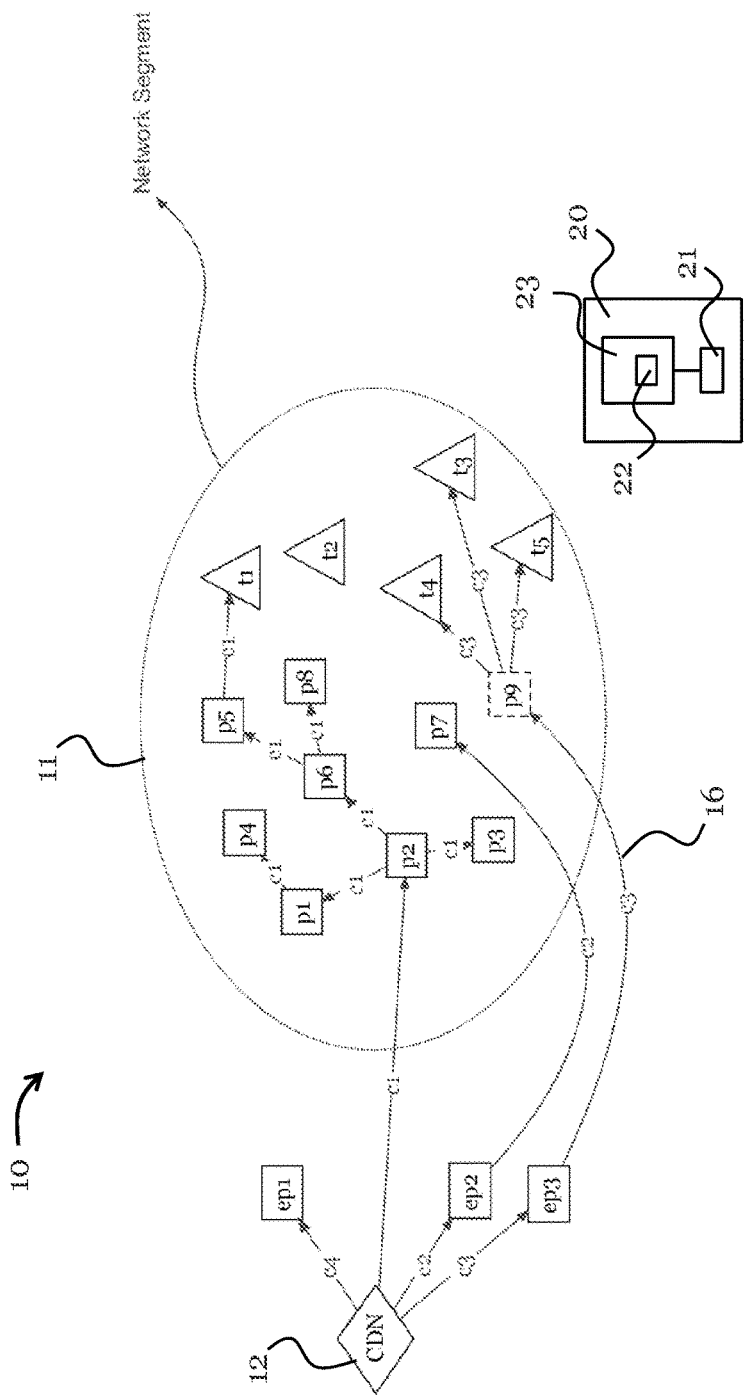
FIG. 2 illustrates an embodiment of the present invention where the number of incoming connections has been reduced by triggering an idle non-constrained peer to download a requested data content stream on behalf of three resource constrained peers.

FIG. 2 illustrates an embodiment of the present invention where the number of incoming connections have been reduced by triggering an idle non-constrained peer p9 to download the data content stream c3 on behalf of three resource constrained peers t4, t5, t6 (i.e. peers constrained/restricted from uploading data content) who are seeking a common content.

In this particular embodiment, this is triggered in a centralized manner, where a network or segment supervising device known as a tracker 20 coordinates the process. The tracker is generally a computationally more powerful device than the peer devices, such as a server. This is advantageous in that the tracker 20 knows the status and capabilities of the peers in the network segment 11 and possibly of the remaining peers in the P2P network 10, depending on the network range the tracker 20 is configured to cover. Thus, the tracker 20 receives a request for a particular data content from one or more of the peers being constrained from uploading the data content to further peers; in this exemplifying embodiment, the resource constrained peers makes a request to download the stream c3 of content data. The tracker 20 then identifies an idle peer p9 within the segment (since there are no peers currently rendering the data content stream c3, or no peers relaying the requested stream c3 to other peers), which idle peer has capacity to upload the data content. Thereafter, the tracker 20 terminates the communication channels via which the resource constrained peers t3, t4, t5 receives the stream c3 of data content (i.e. the communication channels 13, 14, 15 of FIG. 1). This is in practice performed by either having the tracker 20 actively terminating the respective channel, or by having the tracker 20 instructing the respective peer t3, t4, t5 to terminate the channel via which it communicates with the supplier ep3 of data content from outside the network segment 11. Then, the tracker 20 assigns to the currently idle peer p9 a task of establishing a new communication channel 16 with the supplier ep3 of the stream c3 of data content outside the network segment 11, and further to upload the stream c3 of data content to the peers t3, t4, t5 being restrained from uploading the data content. The idle peer p9 has thus become a relaying peer, i.e. a peer used for the purpose of uploading data content to further peers, but which has no interest in rendering the data content itself. It is to be noted that the resource constrained peers t3, t4, t5 may connect to the currently idle peer p9 before terminating the connections 13, 14, 15. It should further be noted that in the exemplifying embodiment of FIG. 2, since the resource constrained peers t3, t4, t5 already were downloading the content data stream c3 from outside the network segment 11 via communication channels 13, 14, 15, it was necessary to terminate those three channels in order to have the idle peer p9 upload the requested data content c3, and thus advantageously reduce the number of incoming channels to the network segment 11; only one incoming channel 16 carries content data stream c3 in contrast to FIG. 1 where three incoming channels 13, 14, 15 transports the data content stream c3.

In an alternative embodiment, the process described in the above is triggered in a decentralized manner, where the respective resource constrained peer t3, t4, t5 coordinate the process. This is advantageous in that there is no need to have a centralized device such as the tracker 20 keeping track of the status and capabilities of the peers. Instead, the peers themselves keep track of status and capabilities, which can be implemented by having the network peers broadcast to the other network peers their status and capabilities using for instance User Datagram Protocol (UDP). Thus, any resource constrained peer t3, t4, t5 desiring to make use of a currently idle peer p9 (not being restricted from uploading data content) instead of directly communicating with a supplier ep3 of data content residing outside the network segment 11 identifies the currently idle peer p9 within the segment, which idle peer has capacity to upload the data content, and makes the request for a desired piece of content to the currently idle peer p9. Thereafter, the resource constrained peers t3, t4, t5 terminate the communication channels via which they receive the stream c3 of data content (i.e. the communication channels 13, 14, 15 of FIG. 1) from the content-supplying peer ep3 outside the network segment 11. Subsequently, the requested stream c3 of content data is instead downloaded from the identified currently idle peer p9, which establishes a new communication channel 16 with the supplier ep3 of the stream c3 of data content outside the network segment 11, and further uploads the requested stream c3 of data content to the resource constrained peers t3, t4, t5. In an embodiment of the present invention, the request for the stream c3 of content data to the currently idle peer p9 comprises destination information of the supplier ep3 of the stream c3 of content data, or destination information to any other supplier of the stream c3 of content data being requested.

With reference to FIG. 2, of all streams of data content c1, c2, c3, the stream c1 is most popular, i.e. the most requested data content stream in the network segment 11, which stream c1 is brought into the network segment 11 by the peer p2. The peers p1, p3, p6 downloads the data stream c1 directly from p2, while peer p4 downloads c1 from p1, and peers p5 and p8 downloads c1. The resource constrained peer t1 will download the desired content stream c1 from peer P5.

Both these aspects of the present invention, i.e. the centralized solution as well as the decentralized solution, are advantageous since the number of incoming connections to a given network segment, in this case embodied by the network segment 11, are reduced while needs of the resource constrained peers are catered to, which is achieved by making effective use of available upload capacity of the non-constrained peers.

With further reference to FIG. 2, tracker 20 comprises a controller/processing unit 21 embodied in the form of one or more microprocessors arranged to execute a computer program 22 downloaded to a suitable storage medium 23 associated with the microprocessor, such as a Random Access Memory (RAM), a Flash memory or a hard disk drive. The controller 21 is arranged to carry out a method according to embodiments of the present invention when the appropriate computer program 22 comprising computer-executable instructions is downloaded to the storage medium 23 and executed by the controller 21. The storage medium 23 may also be a computer program product comprising the computer program 22. Alternatively, the computer program 22 may be transferred to the storage medium 23 by means of a suitable computer program product, such as a digital versatile disc (DVD), compact disc (CD) or a memory stick. As a further alternative, the computer program 22 may be downloaded to the storage medium 23 over a network. The controller 21 may alternatively be embodied in the form of a digital signal processor (DSP), an application specific integrated circuit (ASIC), a field-programmable gate array (FPGA), a complex programmable logic device (CPLD), etc. It should be noted that the peer device correspondingly comprises a microprocessor, computer program and storage medium.

With further reference to FIG. 2, if the P2P network 10 was not carefully arranged, there would be no guarantee that only one incoming connection is set up for delivering the content c1 to the network segment, in particular given that the data content stream c1 is requested by a majority of the peers in the segment 11. In an embodiment of the present invention, a managing peer is assigned for the network segment 11. In the case of the exemplifying embodiment illustrated in FIG. 2, the peer p2 is assigned as the managing peer for the content stream c1. Hence, via a coordination mechanism undertaken e.g. by the tracker 20, the managing peer p2 becomes the peer which solely downloads the content stream c1 from outside the network segment 11. This particular embodiment of assigning a managing peer p2 in the network segment 11 provides a highly efficient approach of performing live streaming in a network segment, for instance a private network, since the number of incoming channels to the network segment 11 are even further reduced, possibly down to a single incoming channel, although that would require that the peers p7 and p9 would connect to any one of the other non-constrained peers p1-p6 or p8 in the network segment 11. Typically, this type of network structure is in the art implemented by means of using one or more routers to multicast the data content within and across the segments. With this embodiment of the present invention, expensive and network-specific multicast routers are not needed. Peers are arranged in either a tree or a mesh P2P connectivity overlay within a given segment and thus exchanges streaming data in an efficient manner. In practice, a private network may comprise tens of different network segments and thousands of peers.

In an embodiment of the present invention, the managing peer p2 of the network segment 11 is assigned by considering a ranking of the segment peers and selecting the peer having the highest ranking as the managing peer. The ranking of the segment peers is based on information regarding status of the peers and includes one or more of peer upload bandwidth, peer download bandwidth, most recently downloaded part for each requested data content stream, Network Address Translation (NAT) compatibility type, peer Central Processing unit (CPU) load, peer (Internet Protocol) IP address, position in data stream for the data content to be downloaded, etc.

The content distribution tree shown for the data content stream c1 in FIG. 2 does not have to be static, it can be transient while making sure that the managing peer p2 is at the root of the tree (at least inside the network segment 11) and that t1 is a leaf node in the tree.

Figure 3:
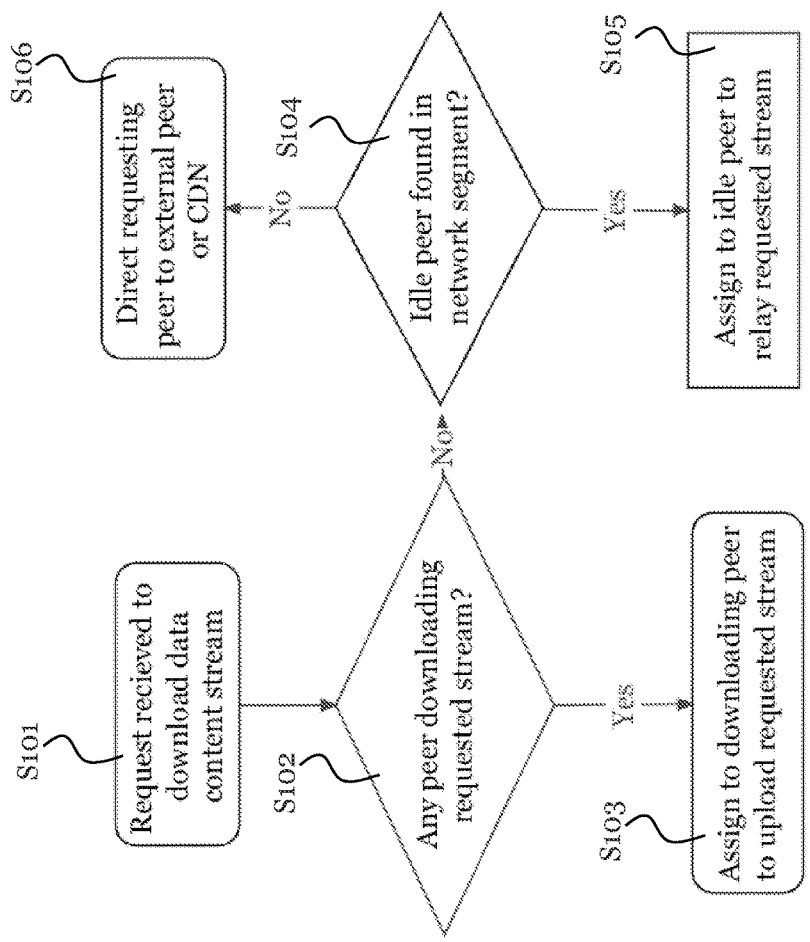
FIG. 3 shows a flowchart illustrating a method performed at a tracker according to an embodiment of the present invention.

Thus, with reference to the flowchart of FIG. 3, a method performed at a tracker according to an embodiment of the present invention is illustrated. Reference is further made to FIG. 2 for illustrating various nodes of the P2P network 10, and the result achieved after the method of FIG. 3 has been performed. In a first step S101, the tracker 20 receives a request from any one (or all) of the resource constrained peers t3, t4, t5, i.e. peers being restricted from uploading content to other network peers as previously has been described, to access a particular stream of the data content, in this case c3. The tracker 20 will respond to the request received from the resource constrained peers t3, t4, t5 by determining in step S102 whether any one of the non-constrained peers p1-p8 is downloading the requested data content stream c3 and thus is capable of uploading the requested data content stream c3. However, although at least peers p3, p4, p5, p7 and p8 appear to have spare upload capacity, none of them is rendering the request data content stream c3 (p7 renders stream c2, while the remaining peers render stream c1). However, in case any non-constrained peer would have rendered the requested data content, it would have been preferred to direct the requesting constrained resource peer(s) t3, t4, t5 to such a non-constrained peer in step S103 in order to advantageously reduce the number of data flowing into the network segment 11, i.e. to reduce the number of incoming communication channels to the network segment 11.

Further with reference to FIG. 3, since in this exemplifying embodiment none of the non-constrained peers already is downloading the requested data content stream c3 and thus cannot provide the requested stream c3 to the requesting resource constrained peers t3, t4, t5, the tracker 20 proceeds to step S104 where the tracker 20 determines whether there are any currently idle non-constrained peers residing in the network segment 11. As can be deducted from FIG. 2, idle peer p9 can indeed by assigned in step S105 to bring the requested content stream c3 into the network segment 11 by establishing a communication with peer ep3 residing outside the segment 11 and subsequently upload the requested content stream c3 to the resource constrained peers t3, t4, t5. The currently idle peer p9 is after this process consequently viewed upon as a relaying peer. If there had not been any currently idle peers residing in the segment 11 with capability to upload data content, the resource constrained peers t3, t4, t5 would have had to recourse to peer ep3 outside the segment 11 or ultimately the streaming source 12 in step S106.

In case the process is undertaken by the peers themselves as previously discussed, similar steps are undertaken. In case the peers interact with each other without consulting the tracker 20, each peer transmits broadcast information to indicate (a) what content the peer is currently rendering or relaying (i.e. whether the peer is downloading a requested stream or not), (b) whether the peer is currently idle, and (c) whether the peer is capable of uploading content data to further peers (i.e. whether the peer is categorized as "non-constrained" or "resource constrained").

In a further embodiment of the present invention described with reference to the flowchart of FIG. 4a, not only is it considered whether a non-constrained peer to which a request is addressed for data content download either (a) is downloading the requested content data stream or (b) is idle, but further whether the non-constrained peer (if any) downloading the requested stream either is (1) a peer currently rendering the requested stream, or (2) a peer merely relaying the requested stream to further peers (without rendering it). Reference will further be made to FIGS. 4b and 4c as well as the previously described FIG. 2 for illustrating different data content streaming arrangements in various situations.

Figure 4A:
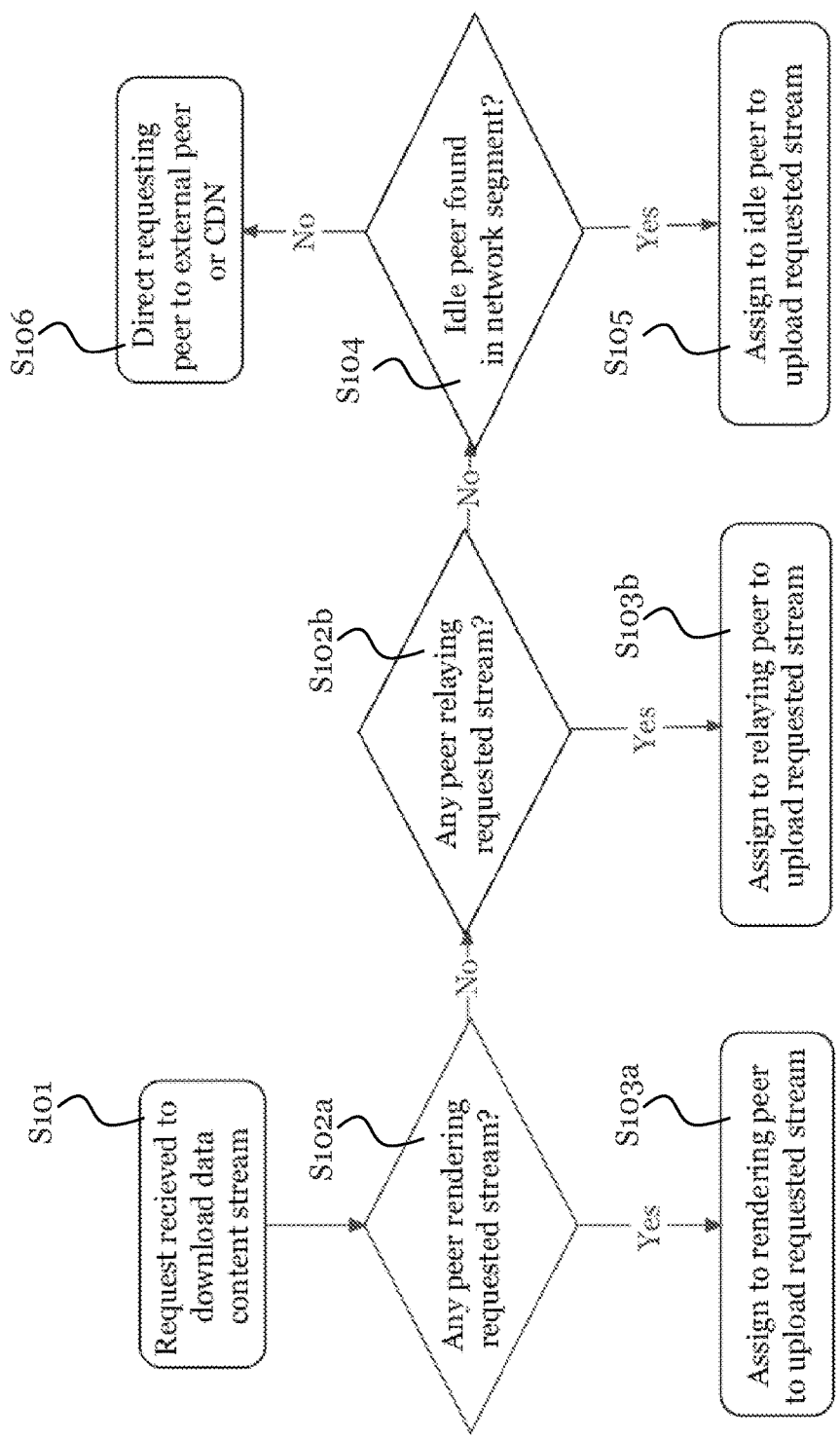
FIGS. 4a-c illustrate a further embodiment of the present invention taking into account whether an uploading peer acts as a rendering peer or a relaying peer.
Figure 4B:
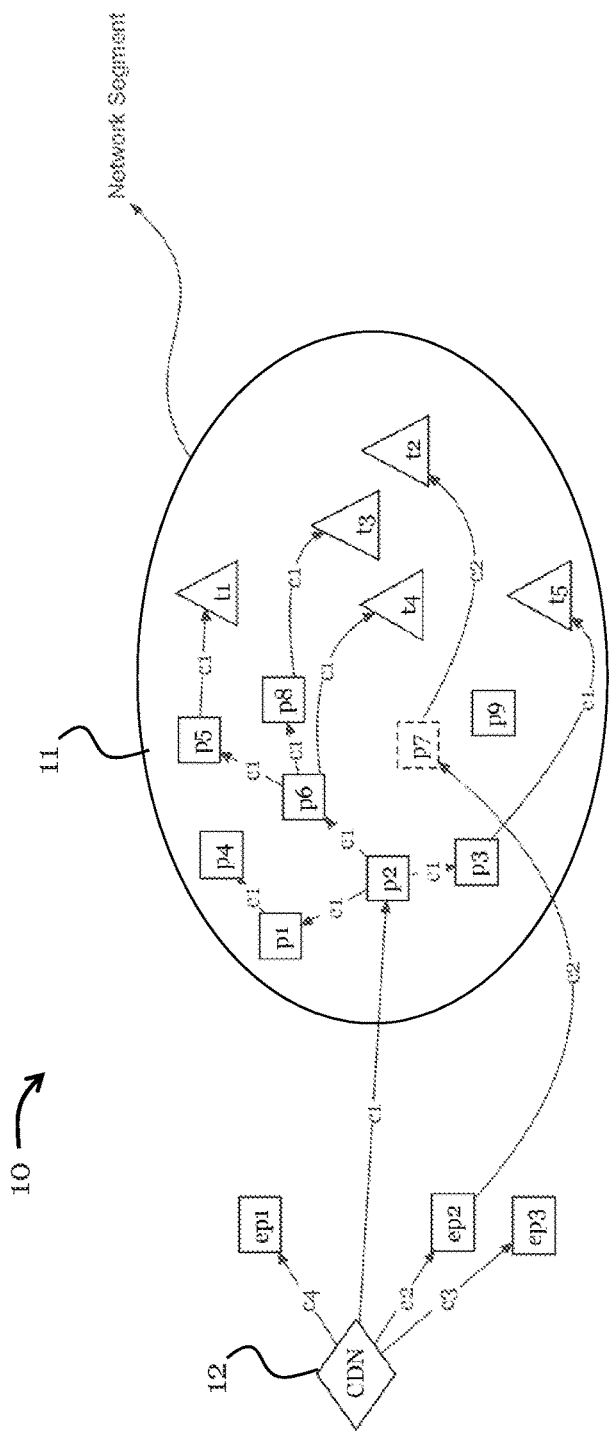
Figure 4C:
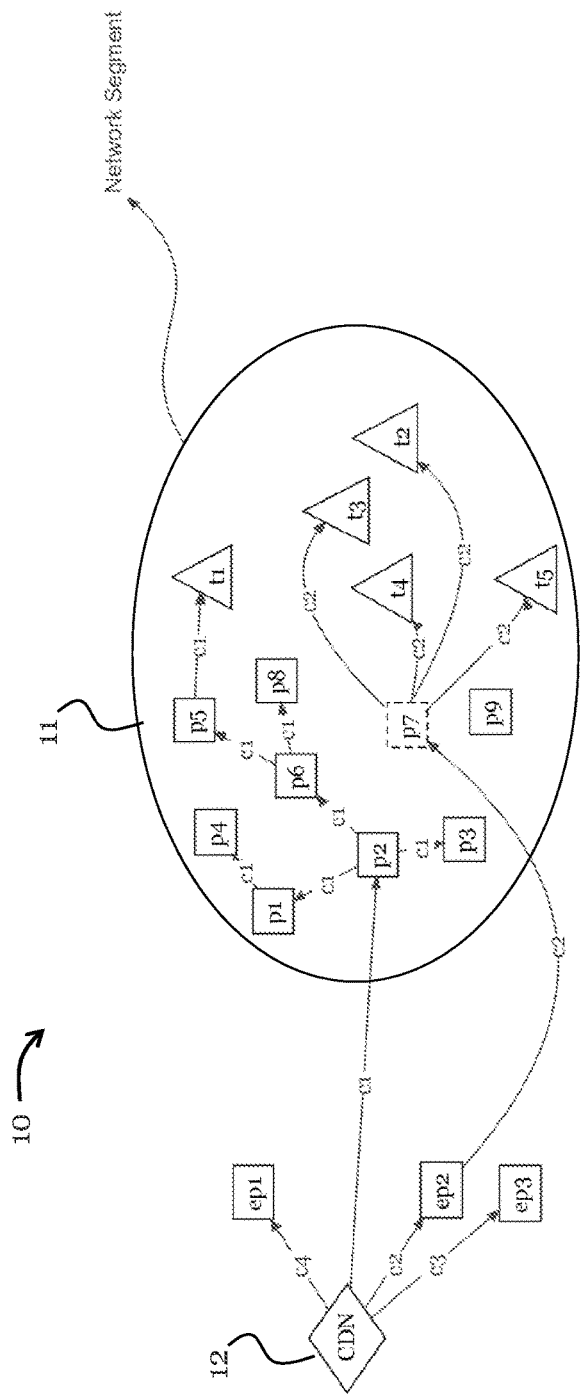

Thus, with reference to the flowchart of FIG. 4a, a method performed at a tracker according to a further embodiment of the present invention is illustrated. Reference is further made to FIG. 4b for illustrating a first selected streaming arrangement in the segment 11 of the P2P network 10. In this exemplifying embodiment, in a first step S101, the tracker 20 receives a request from any one (or all) of the resource constrained peers t3, t4, t5, i.e. peers being restricted from uploading content to other network peers as previously has been described, to access a particular stream of the data content, in this case c1. The tracker 20 will respond to the request received from the resource constrained peers t3, t4, t5 by determining in step S102a whether any one of the non-constrained peers p1-p8 already rendering data content is capable of uploading the requested data content stream c1. All peers p1-p8 are in this example capable of uploading the requested stream c1, wherein the tracker 20 assigns to any of these peers, e.g. peers p3, p6 and p8 in step S103a to upload the requested data content stream c1 to the resource constrained peer(s) t3, t4, t5, respectively. Further, non-constrained peer p7 is relaying data content stream c2 to resource constrained peer t2.

Now, with reference to FIG. 4a and further to FIG. 4c, a second selected streaming arrangement in the segment 11 of the P2P network 10 is illustrated. In this exemplifying embodiment, in a first step S101, the tracker 20 receives a request from any one (or all) of the resource constrained peers t3, t4, t5, i.e. peers being restricted from uploading content to other network peers as previously has been described, to access a particular stream of the data content, in this case c2. The tracker cannot find any peer currently rendering the requested content stream c1, and proceeds to step S102b, where the tracker 20 identifies a relaying peer p7 which is downloading the requested content stream c2 and distributing the content stream c2 to resource constrained peer t2. Thus, the tracker 20 assigns in step S103b to the relaying peer p7 the task of uploading the requested data content stream c2 to the resource constrained peer(s) t3, t4, t5. As previously has been discussed with reference to FIG. 2, if no peer is currently rendering or relaying a requested content data stream to tracker 20 moves on to step S104 to find a non-constrained idle peer to be assigned in step S105, or to find an external peer in step S106. Advantageously, by checking whether relaying peers exists (unless a currently rendering peer exist), the number of idle peers to be recruited may be reduced. Further advantageous is that by selecting a rendering peer before a relaying peer, resources could potentially be freed up, since the relaying peer does not download the data stream for its own benefit, but only for the benefit of the downloaders residing downstream of the relaying peer.

In case the process is undertaken by the peers themselves as previously discussed, similar steps are undertaken. In case the peers interact with each other without consulting the tracker 20, each peer transmits broadcast information to indicate (a) what content the peer is currently rendering or relaying, (b) whether the peer is currently idle, and (c) whether the peer is capable of uploading content data to further peers (i.e. whether the peer is categorized as "non-constrained" or "resource constrained").

Figure 5:
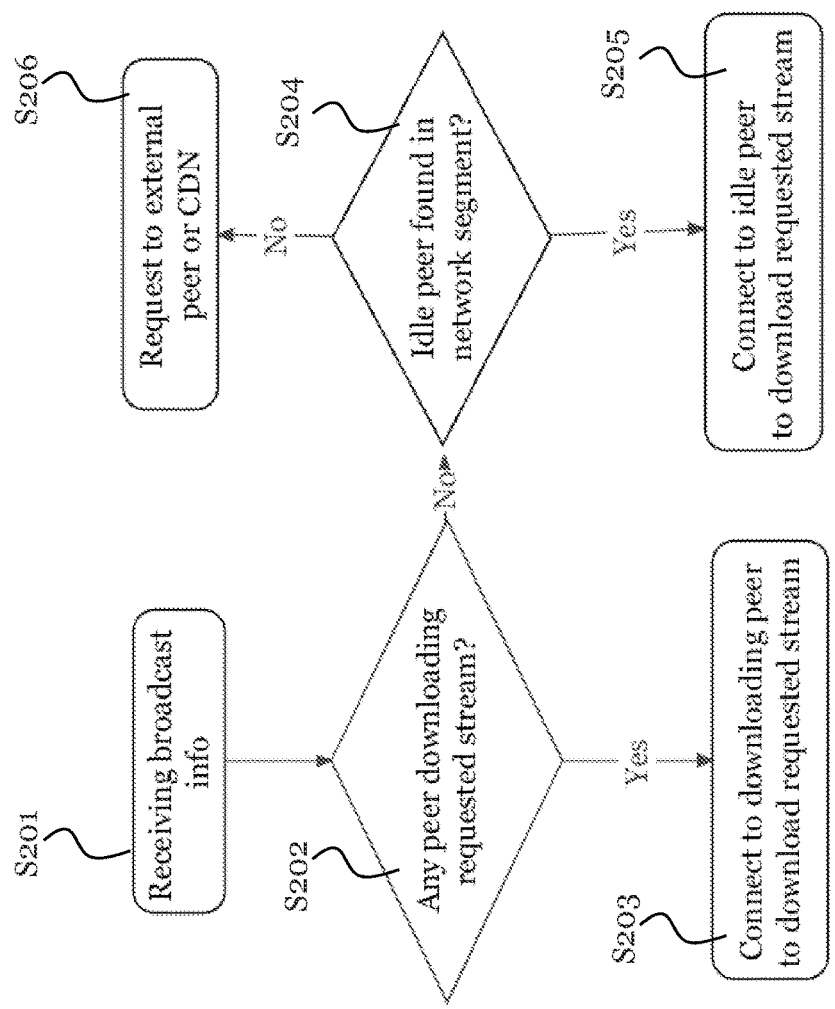
FIG. 5 shows a flowchart illustrating a method performed at a peer according to an embodiment of the present invention.

With reference to the flowchart of FIG. 5, a method performed at a requesting peer according to an embodiment of the present invention is illustrated. In a first step S201, the requesting peer receives from the other peers in the network segment broadcast information regarding which streams of data content the other peers in the network segment are capable of uploading, or whether there are any currently idle peers in the network segment capable of uploading data content streams. Thereafter, in step S202, the requesting peer sends a request for a data content stream to a peer within the network segment being capable of uploading the requested data content stream, which peer is downloading the requested data content stream. If no peer within the segment is downloading the requested data content stream, the requesting peer sends in step S204 a request to a currently idle peer within the network segment, which currently idle peer is capable of uploading the requested data content stream. In step S203, the requesting peer downloads the requested data content stream from the peer being capable of uploading the requested data content, or if no such peer is available, downloads the requested data content stream from the currently idle peer in step S205.

Figure 6:
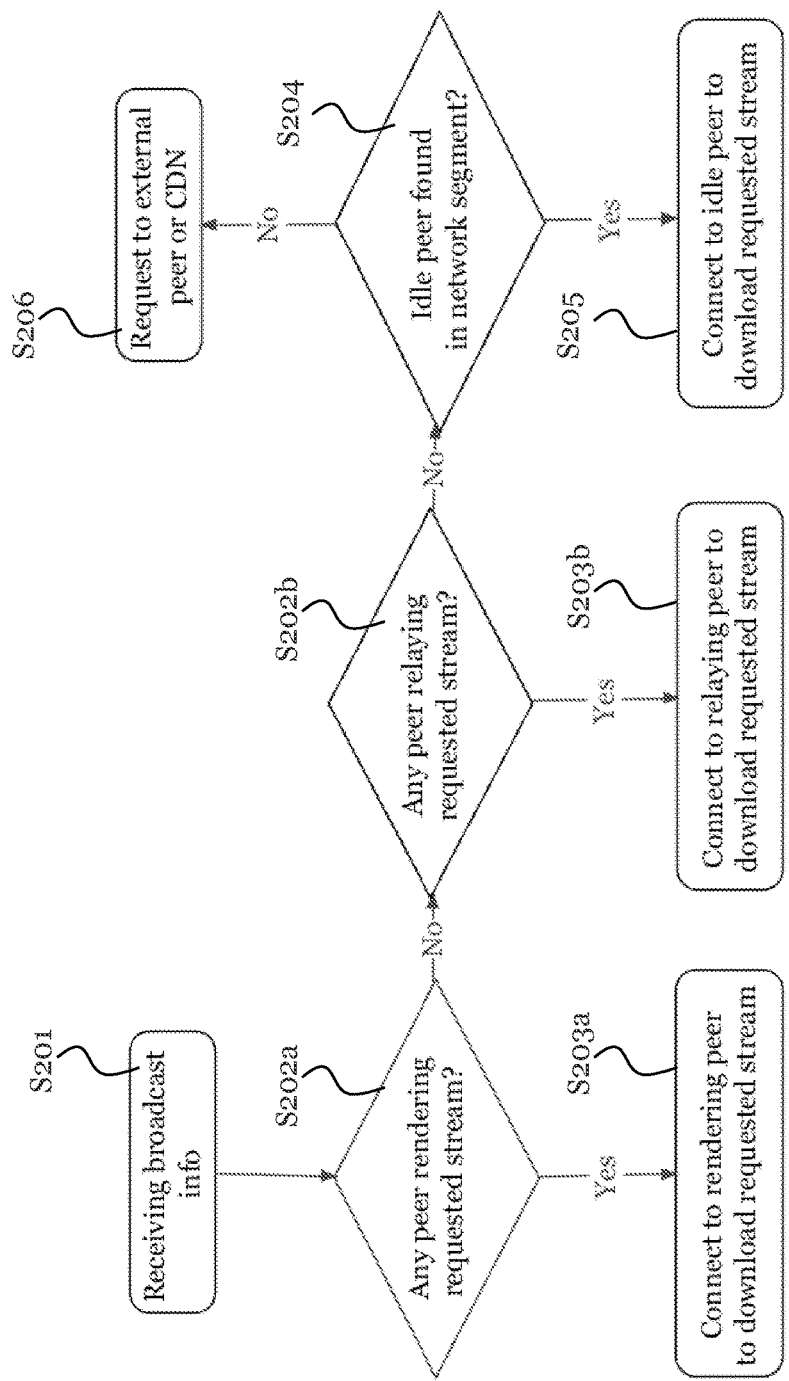
FIG. 6 shows a flowchart illustrating a method performed at a peer according to a further embodiment of the present invention taking into account whether an uploading peer acts as a rendering peer or a relaying peer.

With reference to the flowchart of FIG. 6, a method performed at a requesting peer according to another embodiment of the present invention is illustrated. In a first step S201, the requesting peer receives from the other peers in the network segment broadcast information regarding which streams of data content the other peers in the network segment are capable of uploading, or whether there are any currently idle peers in the network segment capable of uploading data content streams. Thereafter, in step S202a, the requesting peer sends a request to the at least one peer capable of uploading the requested data content stream, which is currently rendering the requested data content stream, and if no such peer is available, the requesting peer sends in step S202b a request to the at least one peer capable of uploading the requested data content stream, which is a peer currently relaying the requested data content stream to at least one further peer.

If no rendering peer or no relaying peer exists within the segment, the requesting peer sends in step S203 a request to a currently idle peer within the network segment, which currently idle peer is capable of uploading the requested data content stream. Finally, the requesting peer downloads the requested data content stream from (1) the rendering peer in step S204a, (2) the relaying peer in step S204b, or (3) the idle peer in step in S205, in that order of priority. As a last resort, the requesting peer will turn to an external peer or source in step S206.

Figure 7:
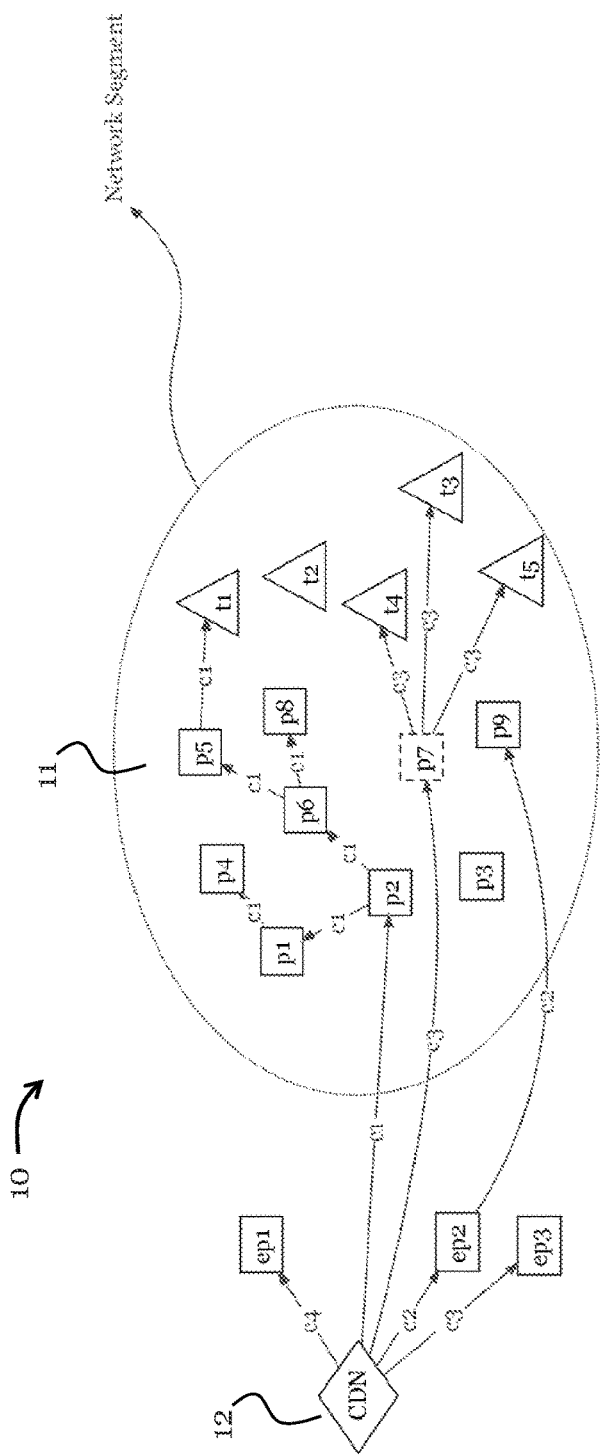
FIG. 7 illustrate a further embodiment of the present invention solving a problem which arises when a relaying peer starts downloading a different piece of content.

FIG. 7 illustrates a further embodiment of the present invention solving a problem which arises when a relaying peer p9 responsible for uploading data to other peers t3, t4, t5 suddenly starts downloading a different piece of content (reference is made to FIG. 2 for a scenario before p9 downloads the different stream); in this case a change is made from content c3 to content c2. In this exemplifying embodiment, non-constrained and previous idle peer p7 starts downloading the requested content c3, in which case the resource constrained peers t3, t4, t5 turns to the (now) relaying peer p7 for the requested piece of content c3 (or is directed to peer p7 by the tracker upon requesting the particular data content stream c3). Further in FIG. 7 can be seen that peer p3 stops rendering content c3 and enters into an idle mode.

Figure 8:
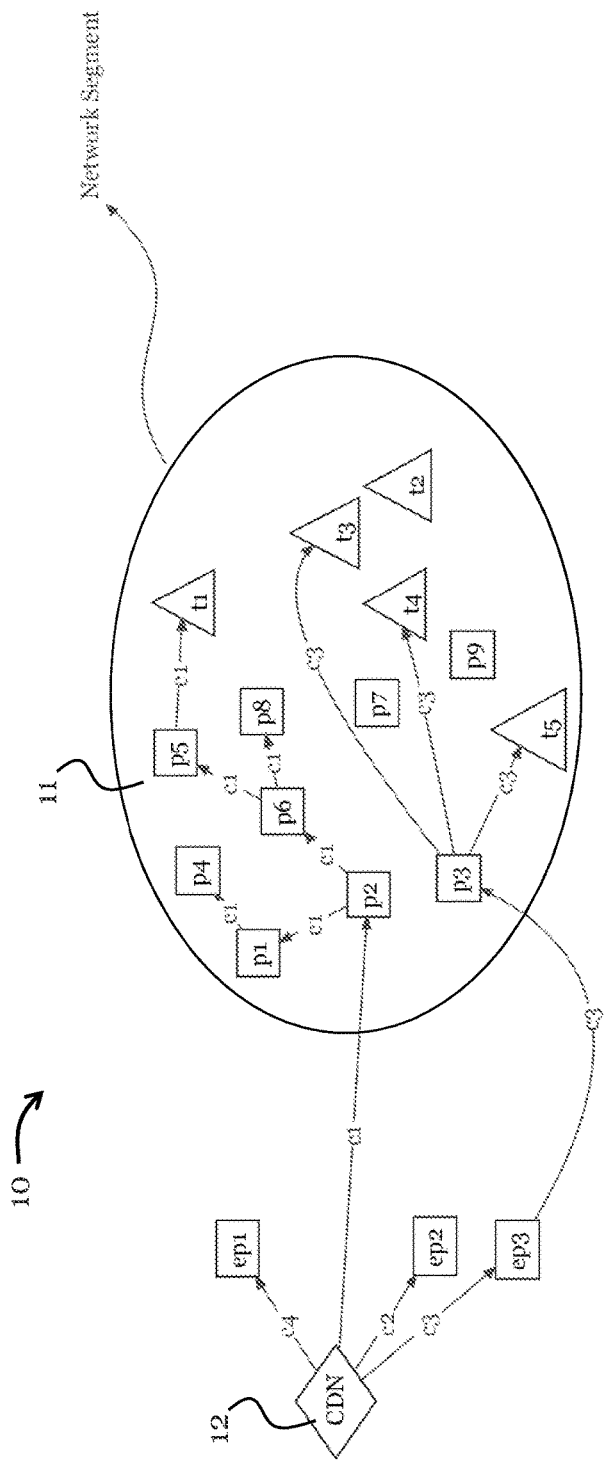
FIG. 8 illustrates yet a further embodiment of the present invention where in case another non-constrained peer in the segment starts rendering a desired piece of content, the resource constrained peers abandon their currently uploading relaying peer.

FIG. 8 illustrates yet a further embodiment of the present invention where in case another non-constrained peer p3 in the segment 11 starts rendering the desired piece of content c3, the resource constrained peers t3, t4, t5 abandons their currently uploading peer p7 for peer p3 (compared to FIG. 7). This is advantageous since the resource provided by peer p7 is freed up for future use (and peer p7 may not be interested in rendering data content c3 anyway, it may download it as a relaying peer only for the purpose of forwarding it to the peers t3, t4, t5 in view of their earlier requests). This is further advantageous in case e.g. the upload capacity of peer p7 is becoming strained.

As previously has been mentioned, the peers in the P2P network 10 may broadcast their status on the network, or in a segment 11. This may include having the peers announce which particular stream of content they are currently rendering and/or uploading to further peer(s) in order to facilitate a handover of a downloading peer from one uploading peer to another uploading peer.

Figure 9:
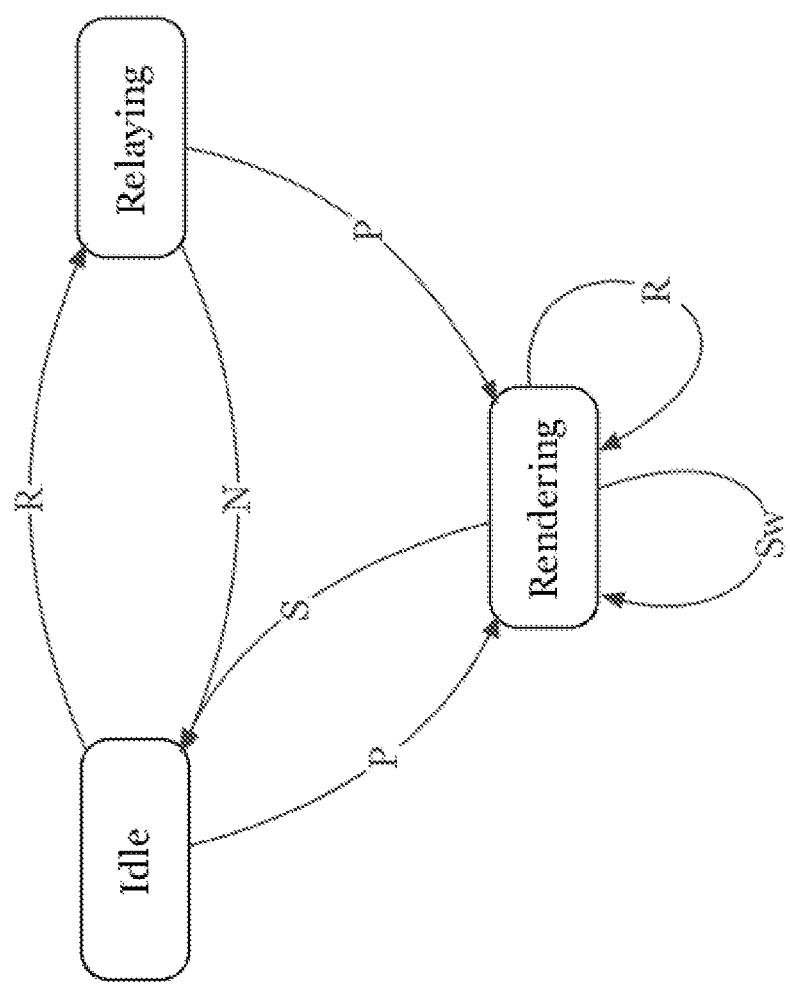
FIG. 9 illustrates a state machine for a non-constrained peer according to an embodiment of the present invention.

FIG. 9 illustrates a state machine for a non-constrained peer according to an embodiment of the present invention. As can be seen, the non-constrained peer can transit between three different states. When in the Idle state, the peer would make a transition R to the Relaying state if a request for upload of a data content stream is received (by the peer itself or the previously discussed tracker). In the Relaying state, the peer does not render the downloaded content itself, but only downloads it for the benefit of uploading the content to further peer(s), and the relaying peer will revert to the Idle state via transition N, if the resource restrained peer no longer requests download of the data content stream. In the Idle state, the peer may start rendering a data content stream, in which case a transition P is made to the Rendering state, where the peer will remain if either a transition Sw for switching to downloading another data content stream is made or if a transition R is undertaken caused by a request from another peer to download the rendered data content stream. The peer will revert to the Idle state via transition S if it stops rendering the content. Finally, when in the Relaying state, the peer will transition P to the Rendering state if it would start rendering the requested data content stream previously only relayed to further peers.

Figure 10:
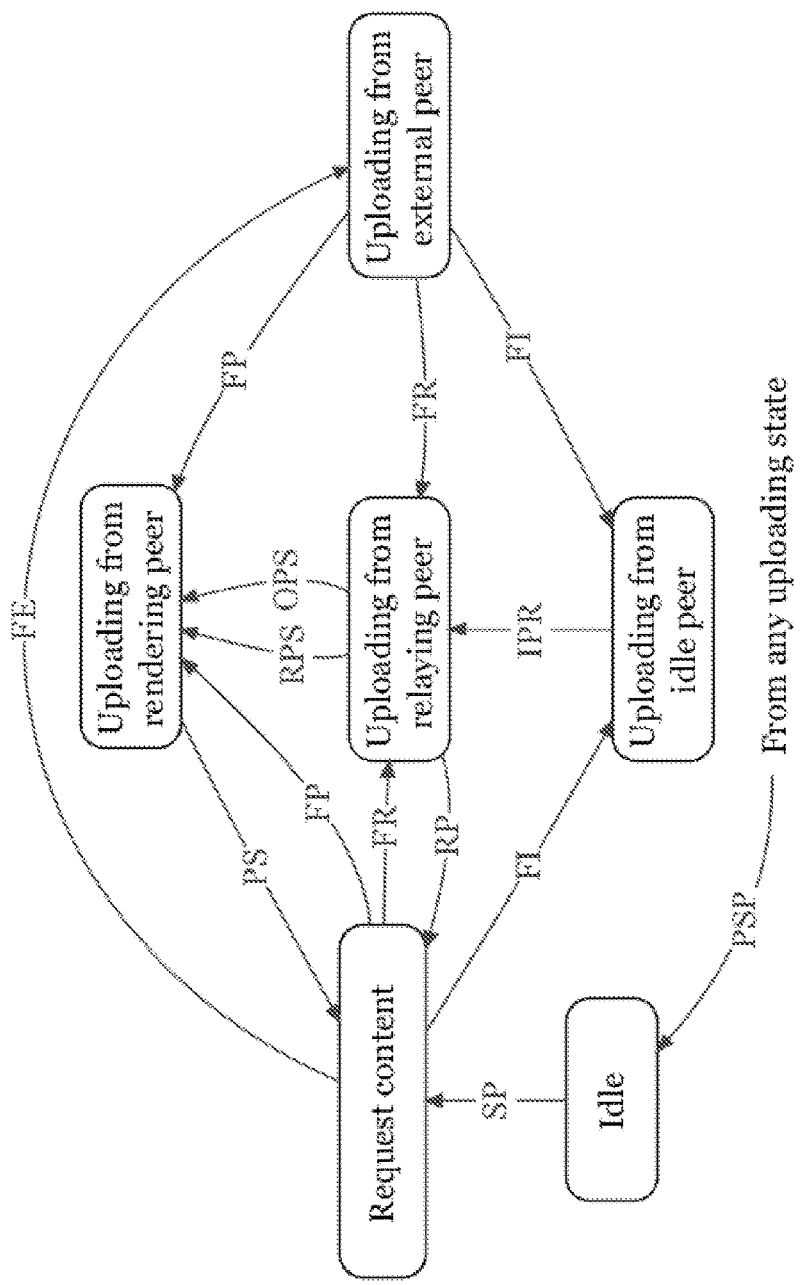
FIG. 10 illustrates a state machine for a resource constrained peer according to an embodiment of the present invention.

FIG. 10 illustrates a state machine for a resource constrained peer according to an embodiment of the present invention. As can be seen, the resource constrained peer can transit between six different states. From any uploading state, if the peer stops playing, a transition PSP is made to the Idle state. In the Idle state, a peer may start requesting content be making transition SP to state Request content. Then, in order of priority: (1) a transition FP is made to state Upload from renderer if any rendering peer can upload the requested content stream, (2) a transition FR is made to state Upload from relay if any relaying peer can upload the requested content stream, (3) a transition FI is made to state Upload from idle if any relaying peer can upload the requested content stream, or (4) a transition FE is made to state Upload from external if no peers can be found in the segment capable of uploading the requested content stream. From the state Upload from renderer, the peer will make a transition PS to state Request content if the uploading rendering peer switches content or stops rendering the requested content (or leaves the segment or switches off). From the state Upload from relay, the peer will make a transition RPS to state Upload from renderer if a relaying peer starts rendering the same content as the relaying peer, or will make a transition OPS to state Upload from renderer if another peer in the network segment starts rendering the requested data content stream; such transition will free up the relaying peer so that is becomes idle (per transition R in FIG. 9). From state Upload from relay, a transition RP to state Request content if the relaying peer starts playing a different content (or leaves the segment or switches off). From the state Upload from idle, the peer will make a transition IPR to state Upload from relay if an idle peer starts relaying a requested piece of content, Finally, from the state Upload from external, a transition FP is made to state Upload from renderer if a rendering peer is found for the requested content in the network segment, a transition FR is made to state Upload from relay if a relaying peer is found (but no rendering peer) for the requested content, and a transition FI is made to state Upload from idle if no rendering peer or relaying peer can be found for the requested content.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method at a network supervising device of managing distribution of data content streams in a segment of a peer-to-peer (P2P) network, said network segment comprising one or more upload resource constrained peers, wherein an upload resource constrained peer is a peer being constrained from uploading the data content streams to further peers, and one or more upload resource non-constrained peers, comprising:
   categorizing peers entering the network segment as upload resource non-constrained peers or upload resource constrained peers;
   receiving a request for a data content stream from at least one of the upload resource peers within the network segment being constrained from uploading the data content streams to further peers;
   identifying whether at least one upload resource non-constrained peer exists within the network segment having resources for uploading the requested data content stream, which upload resource non-constrained peer is downloading the requested data content stream; and if no upload resource non-constrained peer within the segment is downloading the requested data content stream:
   identifying whether at least one currently idle upload resource non-constrained peer exists within the network segment, which currently idle upload resource non-constrained peer has resources for uploading the requested data content stream;
   assigning, on a condition said at least one upload resource non-constrained peer, within the network segment, downloading the requested data content stream is available, to said at least one upload resource non-constrained peer, within the network segment, downloading the requested data content stream, to upload the requested data content stream to the upload resource constrained peer being restrained from uploading the data content streams to further peers; and
   on a condition said upload resource non-constrained peer, within the network segment, downloading the requested data content stream is not available, assigning to said at least one currently idle upload resource non-constrained peer, within the network segment, to download the requested data content stream from a supplier of the requested data content stream residing outside the network segment, and to upload the requested data content stream to the upload resource constrained peer being restrained from uploading the data content streams to further peers.

2. The method according to claim 1, wherein the step of identifying whether at least one upload resource non-constrained peer exists within the network segment having resources for uploading the requested data content stream further comprises:
   identifying whether the at least one upload resource non-constrained peer, within the network segment, having resources for uploading the requested data content stream is an upload resource non-constrained peer, within the network segment, currently rendering the requested data content stream; and if not:
   identifying whether the at least one upload resource non-constrained peer, within the network segment, having resources for uploading the requested data content stream is an upload resource non-constrained peer, within the network segment, currently relaying the requested data content stream to at least one further peer, within the network segment; wherein the step of assigning upload of the requested content data stream further comprises:
   assigning, on a condition said at least one upload resource non-constrained peer, within the network segment, currently rendering the requested data stream is available, to said at least one upload resource non-constrained peer, within the network segment, currently rendering the requested data content stream, to upload the requested data content stream to the upload resource constrained peer being restrained from uploading the data content streams to further peers; and
   on a condition said rendering upload resource non-constrained peer, within the network segment is not available, assigning to the currently relaying upload resource non-constrained peer, within the network segment, to upload the requested data content stream to the upload resource constrained peer being restrained from uploading the data content streams to further peers.

3. The method according to claim 1, further comprising:
   assigning to said currently idle upload resource non-constrained peer, within the network segment, a task of establishing a new communication channel with a supplier of the requested data content stream residing outside the network segment.

4. The method according to claim 1, further comprising:
   terminating a communication channel via which the upload resource constrained peer being constrained from uploading data content to further peers currently downloads the requested data content stream from outside the network segment.

5. The method according to claim 1, further comprising:
   assigning a managing upload resource non-constrained peer in the network segment responsible to download data content streams from a supplier residing outside the network segment and to distribute the downloaded data content streams to at least one further peer in the network segment.

6. The method according to claim 5, wherein the step of assigning a managing upload resource non-constrained peer in the network segment further comprises:
   ranking the upload resource non-constrained peers in the network segment and selecting the upload resource non-constrained peer in the network segment having the highest rank as the managing upload resource non-constrained peer.

7. The method according to claim 5, wherein the managing upload resource non-constrained peer is assigned to at least download the most requested data content stream in the network segment.

8. The method according to claim 7, wherein the managing upload resource non-constrained peer is configured to be the peer to solely download the most requested data content stream from outside the network segment.

9. The method according to claim 1, wherein the request to the currently idle upload resource non-constrained peer for the data content stream comprises destination information of a supplier of the requested data content stream.

10. A method of downloading data content streams at a peer categorized as being constrained from uploading the data content streams to further peers in a segment of a peer-to-peer (P2P) network comprising:

receiving from upload resource non-constrained peers in the network segment broadcast information regarding which data content streams upload resource non-constrained peers in the network segment have resources for uploading;

sending a request for a data content stream to an upload resource non-constrained peer within the network segment having resources for uploading the requested data content stream, which upload resource non-constrained peer is downloading the requested data content stream, on a condition said upload resource non-constrained peer, within the segment, downloading the requested content stream is available;

on a condition said upload resource non-constrained peer within the segment downloading the requested data content stream is not available, sending a request to a currently idle upload resource non-constrained peer within the network segment, which currently idle upload resource non-constrained peer has resources for uploading the requested data content stream, to download the requested data content stream from a supplier of the requested data content stream residing outside the network segment;

downloading, on a condition said upload resource non-constrained peer, within the segment, downloading the requested content stream is available, the requested data content stream from said upload resource non-constrained peer, within the network segment, having resources for uploading the requested data content stream; and on a condition said upload resource non-constrained peer within the network segment is not available, downloading the requested data content stream from the currently idle upload resource non-constrained peer within the network segment.

11. The method according to claim 10, wherein the step of sending a request for a data content stream to an upload resource non-constrained peer within the network segment having resources for uploading the requested data content stream further comprises:

sending a request to the at least one upload resource non-constrained peer, within the network segment, having resources for uploading the requested data content stream, which is currently rendering the requested data content stream, on a condition said upload resource non-constrained peer, within the segment, currently rendering the requested content stream is available;

on a condition said upload resource non-constrained peer within the network segment is not available:

sending a request to the at least one upload resource non-constrained peer, within the network segment, having resources for uploading the requested data content stream, which is an upload resource non-constrained peer currently relaying the requested data content stream to at least one further peer, within the network segment; and wherein the step of downloading the requested content data stream further comprises:

downloading, on a condition said upload resource non-constrained peer, within the segment, currently rendering the requested content stream is available, the requested data content stream from said at least one upload resource non-constrained peer, within the network segment, currently rendering the requested data content stream;

on a condition said rendering upload resource non-constrained peer, within the network segment, is not available, downloading the requested data content stream from the currently relaying upload resource non-constrained peer within the network segment.

12. A network supervising device for managing distribution of data content streams in a segment of a peer-to-peer (P2P) network, said network segment comprising one or more upload resource constrained peers, wherein an upload resource constrained peer is a peer being constrained from uploading the data content streams to further peers, and one or more upload resource non-constrained peers, comprising a processing unit being arranged to:

categorize peers entering the network segment as upload resource non-constrained peers or upload resource constrained peers;

receive a request for a data content stream from at least one of the upload resource peers within the network segment being constrained from uploading the data content streams to further peers;

identify whether at least one upload resource non-constrained peer exists within the network segment having resources for uploading the requested data content stream, which upload resource non-constrained peer is downloading the requested data content stream; and if no upload resource non-constrained peer within the segment is downloading the requested data content stream:

identify whether at least one currently idle upload resource non-constrained peer exists within the network segment, which currently non-constrained idle upload resource peer has resources for uploading the requested data content stream;

assign, on a condition said at least upload resource non-constrained peer, within the network segment, downloading the requested data content stream is available, to said at least one upload resource non-constrained peer, within the network segment, currently downloading the requested data content stream, to upload the requested data content stream to the upload resource constrained peer being restrained from uploading the data content streams to further peers; and on a condition said upload resource non-constrained peer, within the network segment, downloading the requested data content stream is not available, assigning to said at least one currently idle upload resource non-constrained peer, within the network segment, to download the requested data content stream from a supplier of the requested data content stream residing outside the network segment, and to upload the requested data content stream to the upload resource constrained peer being restrained from uploading data content streams to further peers.

13. The network supervising device according to claim 12, the processing unit further being arranged to:

identify whether the at least one upload resource non-constrained peer, within the network segment, having resources for uploading the requested data content stream is an upload resource non-constrained peer, within the network segment, currently rendering the requested data content stream; and if not:

identify whether the at least one upload resource non-constrained peer, within the network segment, having resources for uploading the requested data content stream is an upload resource non-constrained peer, within the network segment, currently relaying the requested data content stream to at least one further peer, within the network segment; and assign, on a condition said at least one upload resource non-constrained peer, within the network segment, currently rendering the requested data stream is available, to said at least one upload resource non-constrained peer, within the network segment, currently rendering the requested data content stream, to upload the requested data content stream to the upload resource constrained peer being restrained from uploading the data content streams to further peers; and on a condition said rendering upload resource non-constrained peer, within the network segment, is not available, assign to the currently relaying upload resource non-constrained peer, within the network segment, to upload the requested data content stream to the upload resource constrained peer being restrained from uploading the data content streams to further peers.

14. The device according to claim 12, the processing unit further being arranged to:

assign to said currently idle upload resource non-constrained peer, within the network segment, a task of establishing a new communication channel with a supplier of the requested data content stream residing outside the network segment.

15. The device according to claim 12, the processing unit further being arranged to:

terminate a communication channel via which the at least one upload resource constrained peer being constrained from uploading the data content streams to further peers currently downloads the requested data content stream from outside the network segment.

16. The device according to claim 12, the processing unit further being arranged to:

assign a managing upload resource non-constrained peer in the network segment responsible to download the data content streams from a supplier residing outside the network segment and to distribute the downloaded data content streams to at least one further peer in the network segment.

17. The device according to claim 16, the processing unit being arranged to:

rank the upload resource non-constrained peers in the network segment and selecting the upload resource non-constrained peer in the network segment having the highest rank as the managing upload resource non-constrained peer.

18. The device according to claim 16, the processing unit being arranged to:

assign the managing upload resource non-constrained peer to at least download the most requested data content stream in the network segment.

19. The device according to claim 18, the processing unit being arranged to:

assign the managing upload resource non-constrained peer to be the peer to solely download the most requested data content stream from outside the network segment.

20. A peer device categorized as being constrained from uploading data content streams to further peer devices in a segment of a peer-to-peer (P2P) network, comprising a processing unit being arranged to:

receive from upload resource non-constrained peer devices in the network segment broadcast information regarding which data content streams upload resource non-constrained peer devices in the network segment have resources for uploading;

make a request for a data content stream to an upload resource non-constrained peer device within the network segment having resources for uploading the requested data content stream, which upload resource non-constrained peer device is downloading the requested data content stream, on a condition said upload resource non-constrained peer, within the segment, downloading the requested content stream is available;

on a condition said upload resource non-constrained peer device within the segment is not downloading the requested data content stream, make a request to at least one currently idle upload resource non-constrained peer device within the network segment, which currently idle upload resource non-constrained peer device has resources for uploading the requested data content stream, to download the requested data content stream from a supplier of the requested data content stream residing outside the network segment;

download, on a condition said upload resource non-constrained peer, within the segment, downloading the requested content stream is available, the requested data content stream from the upload resource non-constrained peer device, within the network segment, downloading the requested data content stream; and on a condition said upload resource non-constrained peer, within the network segment, is not available, download the requested data content stream from the at least one currently idle upload resource non-constrained peer device within the network segment.

21. The peer device according to claim 20, the processing unit further being arranged to:

send a request to the at least one upload resource non-constrained peer, within the network segment, having resources for uploading the requested data content stream, which is currently rendering the requested data content stream, on a condition said upload resource non-constrained peer, within the segment, currently rendering the requested content stream is available;

on a condition said upload resource non-constrained peer within the network segment is not available:

send a request to the at least one upload resource non-constrained peer, within the network segment, capable of uploading the requested data content stream, which is an upload resource non-constrained peer currently relaying the requested data content stream to at least one further peer, within the network segment;

download, on a condition said upload resource non-constrained peer, within the segment, currently rendering the requested content stream is available, the requested data content stream from said at least one upload resource non-constrained peer, within the network segment, currently rendering the requested data content stream; and on a condition said rendering upload resource non-constrained peer, within the network segment, is not available, downloading the requested data content stream from the currently relaying upload resource non-constrained peer within the network segment.

22. The peer device according to claim 21, the processing unit further being arranged to:

include, in the request to the currently idle upload resource non-constrained peer device, within the network segment, for the data content stream, destination information of a supplier of the requested data content stream.

23. A non-transitory computer-readable medium having processor-executable instructions stored thereon which, when executed by at least one processing unit included in a device, will cause the at least one processing unit to perform a method of managing distribution of data content streams in a segment of a peer-to-peer (P2P) network, said network segment comprising one or more upload resource constrained peers, wherein an upload resource constrained peer is a peer being constrained from uploading the data content streams to further peers, and one or more upload resource non-constrained peers, comprising:

categorizing peers entering the network segment as upload resource non-constrained peers or upload resource constrained peers;

receiving a request for a data content stream from at least one of the upload resource constrained peers within the network segment being constrained from uploading the data content streams to further peers;

identifying whether at least one upload resource non-constrained peer exists within the network segment having resources for uploading the requested data content stream, which upload resource non-constrained peer is downloading the requested data content stream; and if no upload resource non-constrained peer within the segment is downloading the requested data content stream:

identifying whether at least one currently idle upload resource non-constrained peer exists within the network segment, which currently idle upload resource non-constrained peer has resources for uploading the requested data content stream;

assigning, on a condition said at least one upload resource non-constrained peer, within the network segment, downloading the requested data content stream is available, to said at least one upload resource non-constrained peer, within the network segment, downloading the requested data content stream, to upload the requested data content stream to the upload resource constrained peer being restrained from uploading the data content streams to further peers; and on a condition said upload resource non-constrained peer, within the network segment, downloading the requested data content stream is not available, assigning to said at least one currently idle upload resource non-constrained peer, within the network segment, to download the requested data content stream from a supplier of the requested data content stream residing outside the network segment, and to upload the requested data content stream to the upload resource constrained peer being restrained from uploading the data content streams to further peers.

24. The non-transitory computer readable medium according to claim 23, wherein the step of identifying whether at least one upload resource non-constrained peer exists within the network segment having resources for uploading the requested data content stream further comprises:

identifying whether the at least one upload resource non-constrained peer, within the network segment, having resources for uploading the requested data content stream is an upload resource non-constrained peer, within the network segment, currently rendering the requested data content stream; and if not:

identifying whether the at least one upload resource non-constrained peer, within the network segment, having resources for uploading the requested data content stream is an upload resource non-constrained peer, within the network segment, currently relaying the requested data content stream to at least one further peer, within the network segment; wherein the step of assigning upload of the requested content data stream further comprises:

assigning, on a condition said at least one upload resource non-constrained peer, within the network segment, currently rendering the requested data stream is available, to said at least one upload resource non-constrained peer, within the network segment, currently rendering the requested data content stream, to upload the requested data content stream to the upload resource constrained peer being restrained from uploading the data content streams to further peers;

on a condition said rendering upload resource non-constrained peer, within the network segment, is not available, assigning to the currently relaying upload resource non-constrained peer, within the network segment, to upload the requested data content stream to the upload resource constrained peer being restrained from uploading the data content streams to further peers.

25. The method according to claim 1, wherein the one or more upload resource constrained peers being constrained from uploading the data content streams to further peers has more limited processing power than an upload resource non-constrained peer not being constrained from uploading the data content streams to further peers.

26. The method according to claim 1, wherein the one or more upload resource constrained peers being constrained from uploading the data content streams to further peers has more limited battery life than an upload resource non-constrained peer not being constrained from uploading the data content streams to further peers.

* * * * *